July 15, 1958

O. C. MEYER 2,843,033

ORCHARD CULTIVATOR

Filed April 8, 1955

2 Sheets-Sheet 1

INVENTOR.
ORVAL C. MEYER
BY
McMorrow, Berman + Davidson
ATTORNEYS

July 15, 1958  O. C. MEYER  2,843,033
ORCHARD CULTIVATOR
Filed April 8, 1955  2 Sheets-Sheet 2
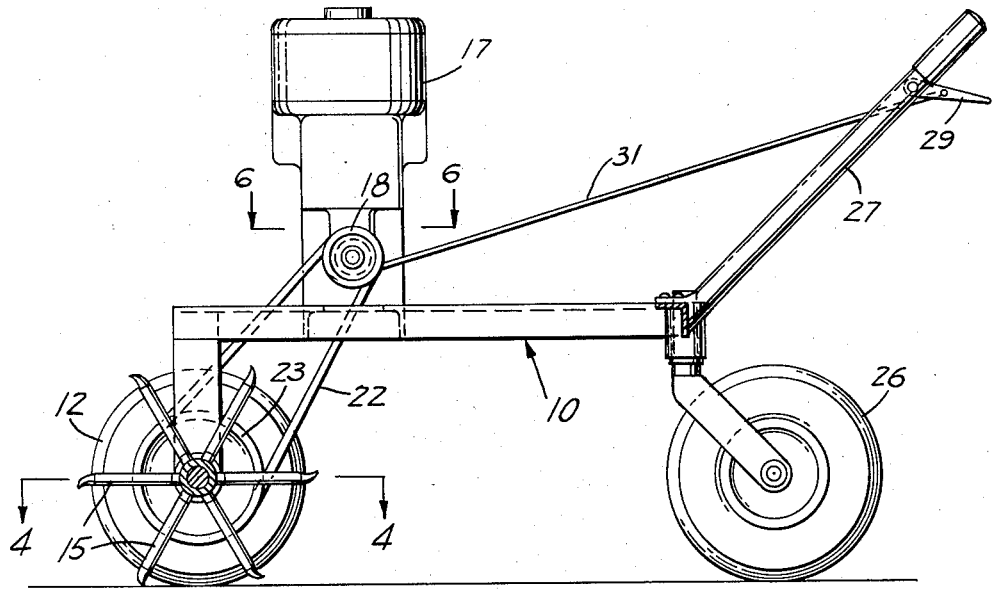
FIG. 3
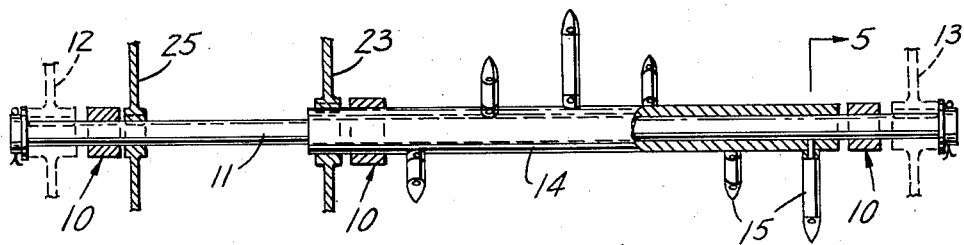
FIG. 4
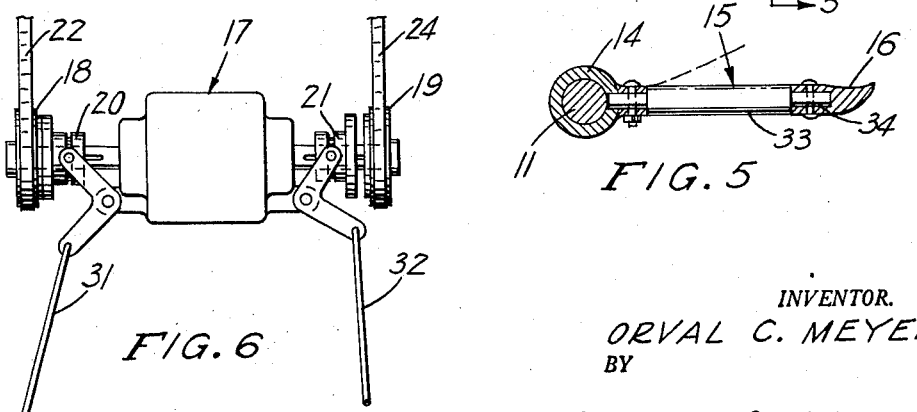
FIG. 5
FIG. 6
INVENTOR.
ORVAL C. MEYER
BY
McMorrow, Berman + Davidson
ATTORNEYS

United States Patent Office 2,843,033
Patented July 15, 1958

2,843,033

ORCHARD CULTIVATOR

Orval C. Meyer, Vincennes, Ind.

Application April 8, 1955, Serial No. 500,129

1 Claim. (Cl. 97—40)

The present invention relates to a rotary cultivator for cultivating the ground closely around a tree.

The primary object of the present invention is to provide a rotary cultivator which will travel in a circle around a tree without manual steering.

Another object of the present invention is to provide a rotary cultivator for use in an orchard which can be started in a circle around a tree and left relatively unattended while it works the ground under the tree.

A further object of the present invention is to provide a rotary cultivator for use in an orchard which is simple in structure, sturdy in construction, economical to manufacture and one highly effective in action.

Figure 1:
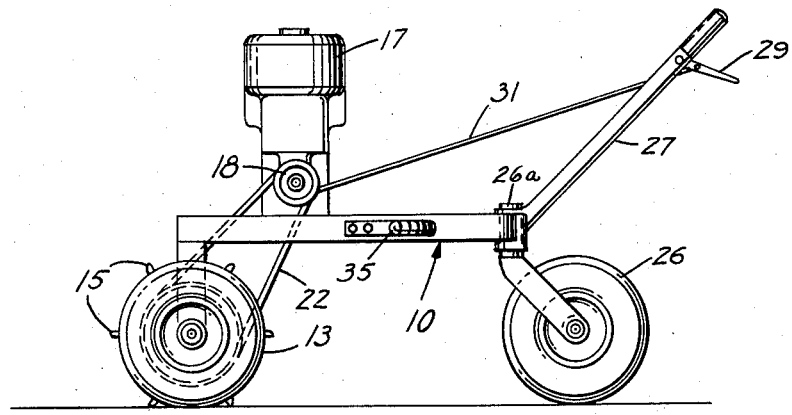
Figure 2:
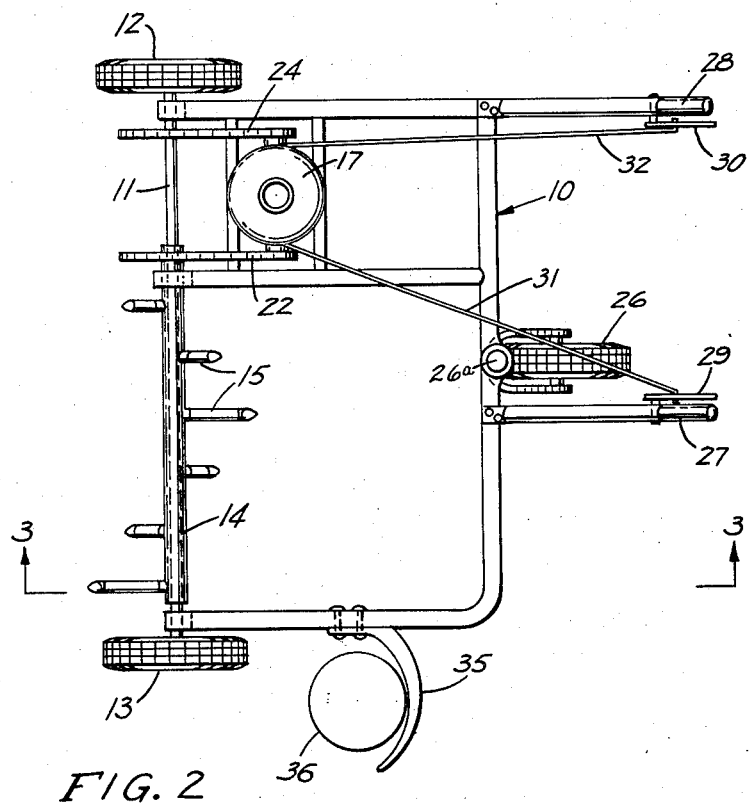

These and other objects and advantages of the present invention will be fully apparent from the following description when taken in connection with the annexed drawings, in which:

Figure 1 is a side view in elevation of the cultivator of the present invention, Figure 2 is a top plan view, Figure 3 is a side view partially in cross-section as taken on line 3—3 of Figure 2, Figure 4 is a detailed view greatly enlarged and partially in cross-section on line 4—4 of Figure 3, Figure 5 is an end view in detail and in partial cross-section as seen in line 5—5 of Figure 4, and Figure 6 is a vertical view on line 6—6 of Figure 3.

Referring in greater detail to the drawings in which like numerals indicate like parts throughout the several views, the present invention consists of a rotary cultivator having a frame 10 to the forward end of which is journaled a horizontally disposed axle 11 for rotary movement and having the driving wheels 12 and 13 fixedly secured one at each end thereof. A sleeve 14 is carried on the axle 11 between the wheels for rotary movement independently of the axle 11 and carries a plurality of spaced tines 15 each fixedly secured by one end to the sleeve 14 and having its other end provided with a ground-working point as indicated in Figure 5 by the reference numeral 16.

Power means is provided for driving the axle 11 in a forwardly driving direction and for rotating the sleeve 14 and consists of an engine 17 having a driving pulley 18 and 19 on each end of its shaft and having a clutch 20 and 21 operatively connecting each of the pulleys 18 and 19, respectively, to the shaft.

A belt 22 connects the pulley 18 with a pulley 23 on one end of the sleeve 14 and another belt 24 connects the pulley 19 with a pulley 25 fixedly secured to the axle 11.

Another wheel 26 is pivotally connected to the rear end of the frame 10 intermediate the pair of sides thereof for movement about a vertical axis or pin 26a and supports the frame 10 in a generally horizontal position. A handle 27 rises from the rear end of the frame substantially midlength thereof and another handle 28 rises from the frame 10 at its side behind the wheel 12.

Levers 29 and 30, one on each of the handles 27 and 28 are connected to the clutches 20 and 21 by the operating rods 31 and 32, respectively.

Each of the tines 15 is made with a semi-flexible strip 33, preferably of rubber, or the like, with a tongue 34 at each end for securing the strip 33 to the point 16 and to the sleeve 14.

An abutment member or hook 35 projects outwardly from the one side of the frame 10 behind and spaced from the wheel 13 and is engageable with a tree 36 (Figure 2) when the cultivator is driven in the forwardly direction. This causes the cultivator to travel in a circle around the tree with the tree as an axis.

In use, the cultivator of the present invention is driven under its own power into the orchard and the clutch 20 is engaged with the pulley 18 to rotatably drive the sleeve 14 causing the tines to scrape and cultivate the soil around the tree, the operator engaging the clutch 21 to drive the wheels in a forwardly driving direction and requiring no steering of the cultivator. The operator can let go of the handles and the machine will cultivate the ground around the tree unattended. When the ground has been sufficiently cultivated, the operator can shift both of the clutches to an inoperative position and can then pull the cultivator backwardly to disengage the abutment member from the tree.

Due to the shaft 11 being journaled at the front end of the cultivator with the engine positioned immediately to the rear of the shaft 11, the weight of the engine will help to hold the tines in engagement with the ground to thoroughly work the surface of the ground adjacent to the tree. The wheel 26 is freely rotatable and will permit the cultivator to travel in a circle, the one wheel 12 closest to the tree being permitted to slip when the cultivator turns.

What is claimed is:

A cultivator comprising a frame having a forward end, a rear end, and a pair of sides, a horizontally disposed axle journaled in the forward end of said frame for rotary movement, a driving wheel fixedly secured to said axle at each end thereof engageable with the ground, a freely rotatable wheel positioned adjacent the rear end of said frame intermediate the sides thereof and pivotally connected to the frame rear end for movement about a vertical axis, a sleeve rotatably carried by said axle intermediate said wheels, a plurality of spaced tines fixedly secured by their one ends to said sleeve for movement therewith and having their other ends engageable with the ground, means for selectively effecting either rotation of said sleeve or the rotation of said axle in a forwardly driving direction, or the simultaneous rotation of said sleeve and said axle in said direction, and an abutment means embodying a hook projecting outwardly of one of the frame sides and behind one of said driving wheels and engageable with the trunk of a tree causing said frame to move in a circle about said tree as an axis when said axle is rotated in said direction.

References Cited in the file of this patent

UNITED STATES PATENTS

| 590,529 | McLaughlin | Sept. 21, 1897 |
| 620,546 | Guenther | Feb. 28, 1899 |
| 1,291,772 | Currier | Jan. 21, 1919 |
| 1,542,963 | Russell | June 27, 1932 |
| 2,514,766 | Judd | July 11, 1950 |

FOREIGN PATENTS

| 512,817 | France | Oct. 23, 1920 |
| 299,296 | Italy | July 27, 1932 |